2,872,220

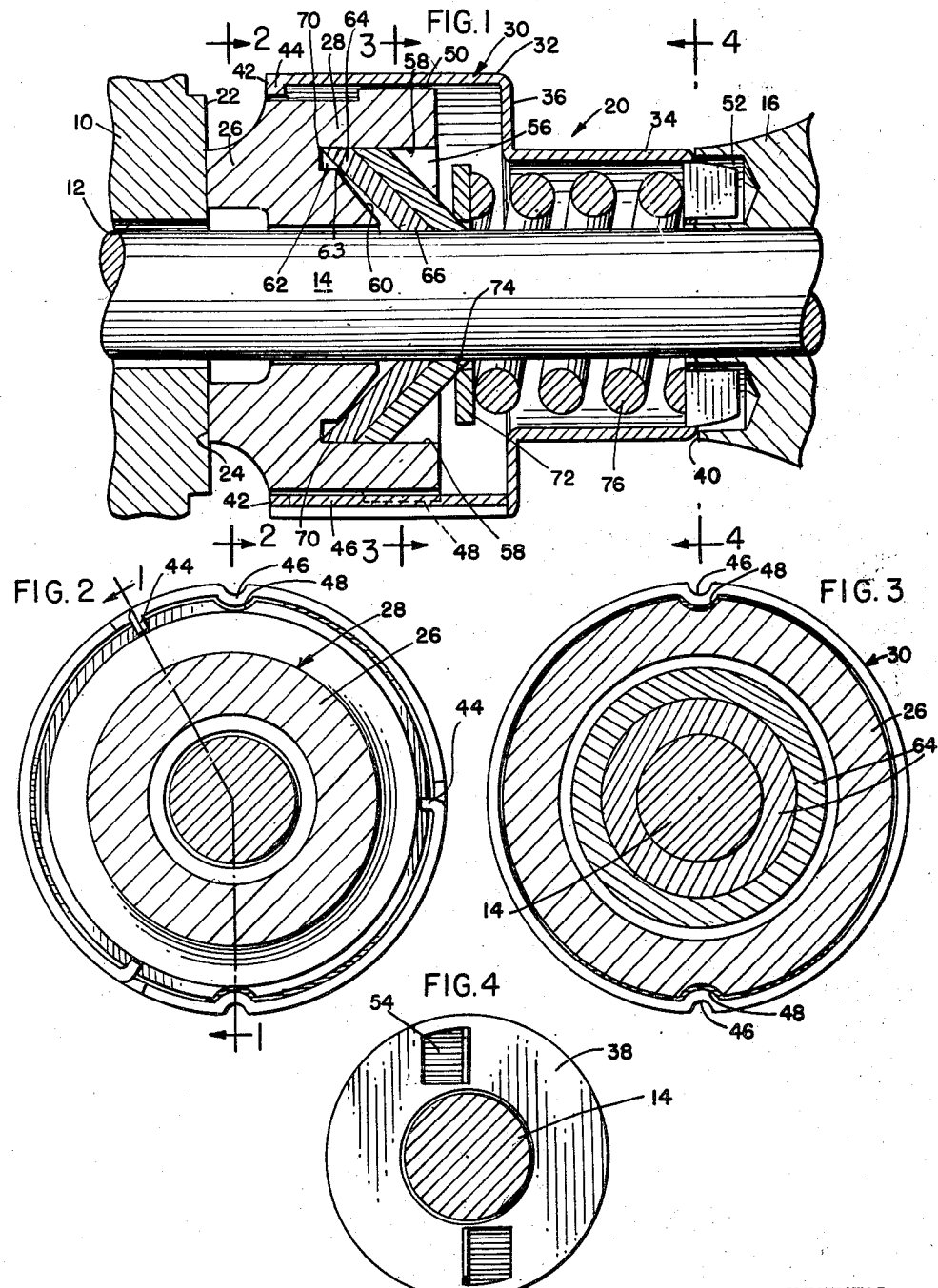
Feb. 3, 1959 — F. E. PAYNE — 2,872,220
FLUID SEAL
Filed Sept. 2, 1952 — 2 Sheets-Sheet 1
INVENTOR.
FRANK E. PAYNE
BY
Edward R. Lowndes Feb. 3, 1959 — F. E. PAYNE — 2,872,220
FLUID SEAL
Filed Sept. 2, 1952 — 2 Sheets-Sheet 2
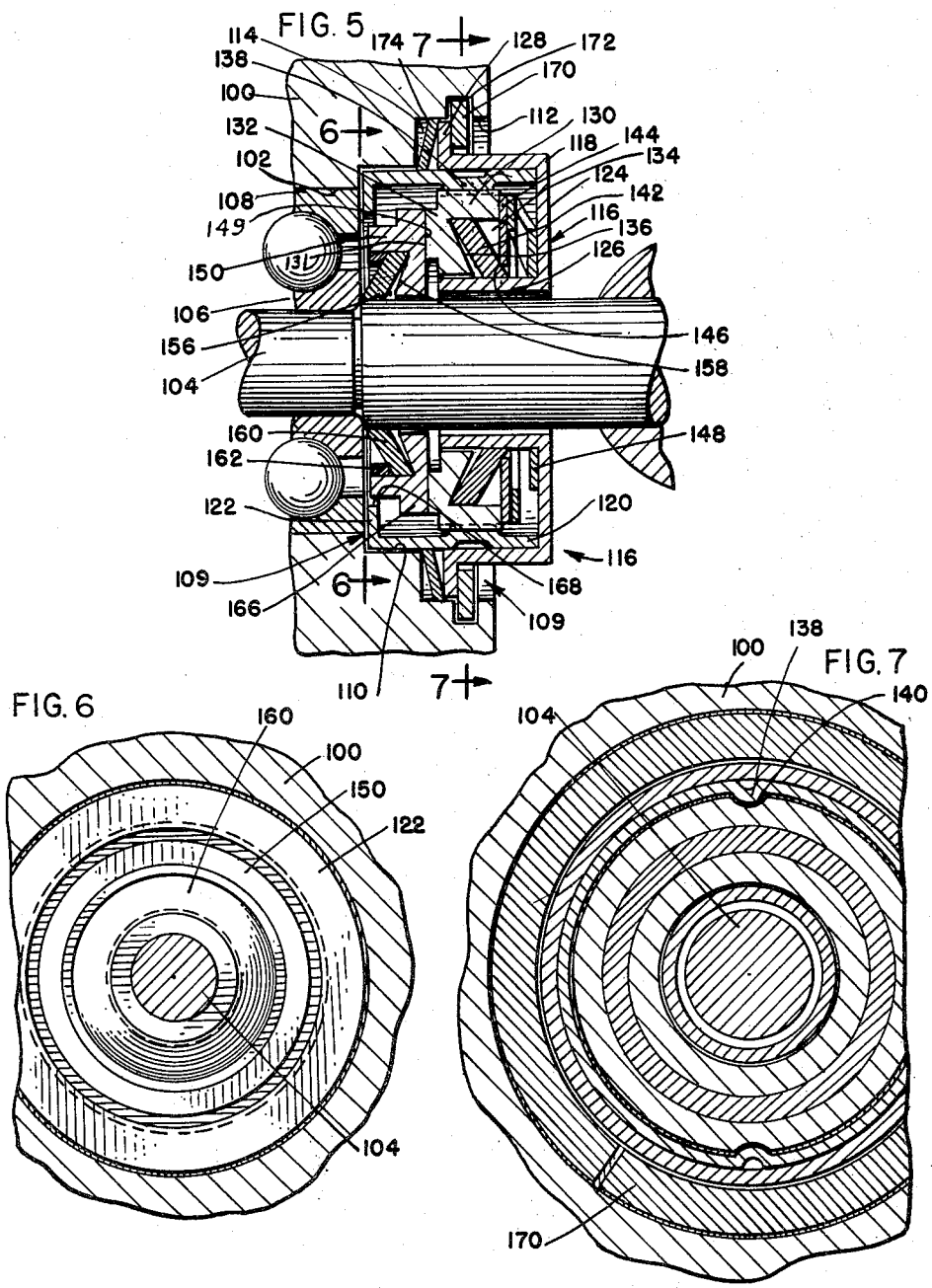
INVENTOR:
FRANK E. PAYNE
BY
Edward R. Sounders United States Patent Office 2,872,220
Patented Feb. 3, 1959

FLUID SEAL

Frank E. Payne, Glencoe, Ill.; Continental Illinois National Bank & Trust Company of Chicago, executor of said Frank E. Payne, deceased, assignor to Crane Packing Company, Morton Grove, Ill., a corporation of Illinois Application September 2, 1952, Serial No. 307,455

1 Claim. (Cl. 286—11.15)

The improved fluid seal comprising the present invention has been designed primarily for use in connection with end face seals. The invention, however, is susceptible to other uses and the same may, if desired, with suitable modification, be adapted for use with lip type seals. The invention may also be found useful in connection with packing glands for stationary parts, as for example as a packing assembly for such glands, or as a gasket for sealing relatively stationary parts. Irrespective however of the particular use to which the present invention may be put, the essential features thereof are at all times preserved.

Bearing seals constructed in accordance with the principles of the present invention will be found useful for ordinary applications, as for example in automotive fluid circulating pumps, refrigerator drive units and other mechanisms wherein ordinary temperatures, pressures and chemically inert liquids prevail and where other types of seals have served their purposes with a reasonable degree of success. The invention will find further usefulness in connection with special applications involving high temperatures, pressures, active chemicals or any combination of these phenomena where other seals have proven unreliable. Examples of such special applications are hot water heaters, where temperatures in the neighborhood of 275° F. are encountered, in steam installations where higher temperatures and pressures as high as 400 p. s. i. are not uncommon, or in chemical manufacturing or treating establishments where corrosive liquids are pumped under pressure and at high temperatures and/or pressures. One specific example of this latter use for the seal is in glass etching plants where hydrofluoric acid is recirculated.

The efficiency of the present bearing seal for such uses is predicated upon a different operating principle, a new design and the use of modern materials developed for seal purposes but employed in a new manner so as to produce a highly efficient seal capable of the many and varied uses outlined above.

The provision of a seal of the character briefly outlined above being among the principal objects of the invention, a further object thereof, in an end face seal having running sealing surfaces, is to provide an effective seal between one of the sealing elements per se and the element on which it is mounted, whether the latter be the stationary part or whether it be the rotating or otherwise relatively movable part.

In carrying out the above mentioned objects, briefly, the invention contemplates the provision of a novel form of sealing ring designed for interpositioning between two parts which are to be sealed relative to each other, together with yieldable pressure applying means for causing the sealing ring to bear against each of the two parts by a wedging action wherein the sealing ring or member is firmly pressed into engagement with each of the two parts.

A still further object of the invention, in a seal of this character, is to provide such a sealing ring together with means for applying pressure thereto which is so disposed relative to the two parts that extremely small pressures need be applied to the member to effect sealing engagement with the two parts between which it is interpositioned. In this manner the rate of the spring employed may be extremely low while at the same time it will effect relatively high pressures at the sealing surfaces. The provision of a seal of this character thus permits the use of a spring having relatively small dimensions so as to enable the overall size of the seal to be materially reduced.

Still another object of the invention in a bearing seal of this character is to provide a novel package-type seal which is substantially self-contained, i. e. in which all the parts thereof may be assembled by the seal manufacturer so that the entire seal may be handled as a unit.

A further object of the invention is to provide such a seal in which the various parts that make up the same may be assembled and permanently secured in position without necessitating the use of fastening devices such as set screws and the like and which, when thus assembled, may be applied as a unit to the relative rotatable parts for sealing purposes.

An additional object of the invention, in a further modified form thereof, is to provide such a seal having plural or compound sealing elements designed to effect a wedging action on the opposed surfaces of a rotating shaft and a housing recess and in which one or more of the sealing elements will at all times be maintained in sealing contact with a fresh cylindrical surface of the shaft to effect a seal therewith despite the fact that other sealing elements in the assembly may traverse a pitted area on the shaft or an area on which an accumulation of carbonaceous or other material may have been built up.

The provision of a seal of the character set forth above which is relatively simple in its construction and which therefore may be manufactured at a low cost; one which is rugged and durable in use and which therefore is capable of long and efficient use; one which is possessed of a minimum number of relatively moving parts and which therefore is unlikely to get out of order; one which is silent in its operation; and one which otherwise is well adapted to perform the services required of it are further desirable features that have been borne in mind in the production and development of the invention.

Other objects and advantages of the invention, not at this time enumerated will become more readily apparent as the nature of the invention is better understood.

In the accompanying two sheets of drawings forming a part of this specification, several embodiments of the invention have been shown. In these drawings:

Fig. 1 is a fragmentary longitudinal sectional view taken substantially centrally through a pump construction showing one form of the improved bearing seal applied thereto. This view is taken substantially along the line 1—1 of Fig. 2.

Fig. 2 is a transverse sectional view taken substantially along the line 2—2 of Fig. 1.

Fig. 3 is a sectional view taken substantially along the line 3—3 of Fig. 1.

Fig. 4 is a sectional view taken substantially along the line 4—4 of Fig. 1.

Fig. 5 is a longitudinal sectional view similar to Fig. 1 showing a compound package-type sealing unit embodying additional applications of the present invention in sealing the counterpart elements thereof, the seal as a whole being employed for the purpose of sealing a rotatable shaft relative to the housing in which it is rotatably mounted.

Fig. 6 is a sectional view taken substantially along the line 6—6 of Fig. 5, and Fig. 7 is a sectional view taken substantially along the line 7—7 of Fig. 6.

In all of the above described views, similar characters of reference are employed to designate similar parts throughout.

Referring now to the drawings in detail and in particular to Figs. 1 to 4 inclusive, the improved seal of the present invention has, purely for illustrative purposes, been shown in connection with an end face seal of the so-called package-type and the seal itself has been shown as being operatively associated with a pump construction including a casing fragmentarily shown at 10 having an opening 12 therein through which the rotatable pump shaft 14 extends. An impeller, fragmentarily shown at 16, is secured to the shaft 14 in any suitable manner. The sealing unit of the present invention is designated in its entirety at 20 and is provided for the purpose of sealing the water side of the pump against egress of the liquid and to seal the air side of the pump against ingress of the air. Referring now in more detail to the construction of the seal assembly of Figs. 1 to 4 inclusive, the assembly is adapted to be positioned between the inner end of the impeller 16 and a radial face 22 provided on the casing 10. The radial face 22 is preferably lapped to a high degree of flatness and is designed for running sealing engagement with a similarly lapped sealing surface 24 provided at the end of the nose portion 26 of a sealing washer 28, the washer being of annular form and surrounding the shaft 14. The washer 28 is adapted to slide axially and with freedom of movement within a retainer 30 in the form of a hollow shell which surrounds the washer and shaft and which is drivingly connected to the impeller 16 in a manner that will be set forth subsequently. The washer 28 is preferably molded from any of the materials commonly used in the construction of such sealing washers, as for example the materials disclosed in the U. S. patent to Teeple, No. 2,326,000 dated August 3, 1943.

The shell-like retainer 30 includes a cylindrical portion 32 of relatively large diameter, a reduced cylindrical portion 34, an inter-connecting radial wall 36 and an end face or wall 38 (see also Fig. 4) adapted to abut against the inner end face 40 of the impeller 16. The other end of the retainer 30 is provided with an open rim 42 having a series of inwardly staked lips or shoulders 44 (see also Fig. 2) of which there are preferably three in number spaced 120° apart. The cylindrical portion 32 of the retainer is formed with a pair of longitudinal inwardly extending ribs 46 which are diametrically opposed across the retainer and which extend into a pair of longitudinal grooves or recesses 48 provided in a raised cylindrical surface 50 formed on the periphery of the washer 28 at the rear side thereof. The interlocking inwardly extending ribs 46 and grooves 48 constitute a driving means whereby the washer 28 may be driven from the shaft 14 through the impeller 16 and retainer 30.

The inwardly staked lips or shoulders 44 are positioned in the axial path of movement of the raised cylindrical portion 50 of the washer 28 to maintain the latter within the retainer and prevent axial separation of these parts.

The driving connection between the impeller 16 and the retainer 30 may be effected in numerous ways, one effective way consisting in the provision of a pair of drilled recesses 52 in the end face 40 of the impeller and of a pair of struck-out tongues 54 which project outwardly from the end wall 38 of the retainer and which latter tongues project into the recesses 52.

The washer 28 is provided with a circular recess 56 in its rear face providing a central cylindrical bore 58, the bottom of which is generally cone shaped as shown at 60. An annular clearance groove 62 facilitates machining of the bore of the recess 56 as well as forming an annular rearwardly presented shoulder 63 which serves a function in the seal assembly that will be made clear presently.

In order to seal the washer 28 to the shaft 14 and prevent passage of fluid from the water side of the pump to the atmosphere, one or more sealing rings or cone frusta 64 encircle the shaft and are nested within the cylindrical bore or recess 58 as shown in Fig. 1. The frusto-conical members 64 are formed of a material which possesses a considerable degree of resistance to compressional forces without undergoing deformation and each frusto-conical member is provided with a cylindrical inner periphery 66 designed for sealing engagement with the shaft and with an outer cylindrical periphery or rim 70 designed for sealing engagement with the cylindrical bore 58 provided in the sealing washer 28. The slant angle of the frusto-conical sealing members 64 may vary within prescribed limits but in any instance the slant height of the cone frustum will be in excess of the radial distance between the surface of the shaft 14 and the inner surface of the recess 56. The slant angle of the frusto-conical members 64 shown in Fig. 1 is approximately 45° but it will be understood of course that other slant angles are contemplated, the particular slant angle selected being a function of the desired pressures at the inner and outer peripheral edges of the frusto-conical members 64. Under certain circumstances it has been ascertained that a slant angle as great as 85° will be required for maintaining an efficient seal, while at other instances a slant angle as small as 10° will be sufficient. The frusto-conical members 64 are convex as viewed from the right hand side of Fig. 1 (looking toward the sealing washer 28) and the forward rim 70 of the foremost cone frustum seats at the bottom of the groove 62 and against the cylindrical bore 58 thereof. The slant angle of the conical surface 60 provided on the sealing washer 28 is preferably less acute than the slant angle of the inner surfaces of the sealing members 64 for a purpose that will be set forth presently.

A thrust member in the form of a washer 72 surrounds the shaft 78 and has its internal periphery slightly spaced from the shaft. The forward inner edge of the washer 72 is rounded as at 74 and is adapted to bear against the rearmost frusto-conical member 64. A coil spring 76 surrounds the shaft 28 and bears at one end against washer 72 and at the other end against the end wall or face 38 of the retainer 30. The spring 76 thus serves to normally urge the thrust washer 72 toward the left as viewed in Fig. 1 so that the rounded rim portion 74 thereof exerts pressure on the rearmost frusto-conical member 64 at a region near the small base of the cone frustum. The two nested frusto-conical members are thus normally urged in the direction of the sealing washer 28 and a wedging action obtains whereby the body of each frusto-conical member tends to straighten out in radial fashion but is prevented from doing so by the space limitations provided for it. In this manner a strong wedging action, the effect of which is a function of the slant height of the cone frustum relative to the radial distance between the shaft 14 and bore 58 is attained.

It has previously been stated that the material from which the frusto-conical members 64 are constructed is relatively incompressible. The term "incompressible" as employed herein refers to the inability of the material to decrease in overall volume when subjected to a compressional force. In other words, the material lacks compressibility in the sense that a sponge possesses it. One material which fulfills the requirements of the present seal is polytetrafluorethylene polymer which is manufactured and sold by E. I. du Pont de Nemours & Co., under the trade-name "Teflon." This material is characterized by its chemical inertness ranging from extremely low temperatures up to 572° F. In this range the material resists the attack of corrosive reagents and solvents. Physically, molded Teflon is a tough white-to-gray solid. The material is practically incompressible but it is subject to deformation or cold flow with such deformation taking place in direct proportion to some power of the applied deforming force. Upon release of the compressive force the material tends to resume its original dimensions.

From the above description it will be seen that when the bearing seal is placed in operative position in a pump construction such as that disclosed in Fig. 1, the sealing surface 24 provided at the end of the nose portion 26 of the sealing washer 28 will be positioned, under spring pressure acting through the frusto-conical members 64, against the radial face 22 of the casing. As the shaft 14 rotates, carrying with it the impeller 16, a positive drive will exist from the impeller through the drilled holes 52 and tongues 54 and through the body of the retainer 30 to the washer 28 through the inter-locking ribs 46 and grooves 48. By virtue of the positive drive train thus established, any rotary thrust upon the frusto-conical sealing member 64 is eliminated while at the same time the sliding inter-fitting connection between the ribs 46 and grooves 48 will permit limited longitudinal shifting movement of the washer 28 to take up for progressive wear of the nose piece 26.

During operation of the seal, the thrust washer 72 is forced against the rearmost frusto-conical member 64 to create the wedging action previously referred to in order to effect the seal at the inner and outer peripheral edges of the members 64. To seal these concentric areas or regions it is obvious that the frusto-conical members must be forced against the surface of the shaft 14 and against the surface of the cylindrical bore 58 with a force sufficient to prevent seepage of the confined liquid around the members 64. The magnitude of the required force varies not only with operating conditions but also with the slant angle of the frusto-conical members.

It is axiomatic that if a certain degree of force between two surfaces such as a face on one of the members 64 and the surface of the shaft is required to effect a seal, the material of the member 64 must exert an opposing force at least equal to that tending to compress it. The necessary degree of force applied to the material of the frusto-conical member 64 may be attained by the use of a relatively light spring 76 inasmuch as the force of the spring is greatly increased by the wedging action of the member 64 in the recess 58, particularly when the slant angle of the member approaches the maximum permissible slant angle.

In certain types of installation, particularly where the washer 28 is formed of carbon or of a carbon compound or mixture, there is a tendency for a carbon deposit to build up on the shaft 14 in the immediate vicinity of the washer. Where ordinary lip-type seals are concerned, wearing of the nose piece 26 of the washer 28 frequently will cause the preloaded portion of the sealing element to telescope over this carbonaceous deposit and when this occurs the efficacy of the seal is rapidly destroyed. In the present instance where plural nested cone-shaped sealing elements such as the members 64 are employed, the traversing of the carbonaceous deposit by the foremost sealing member will not necessarily impair the efficiency of the seal inasmuch as the remaining sealing members will find contact with a clean surface on the shaft.

Referring now to Figs. 5, 6 and 7, wherein a composite package-type seal utilizing the principles of the present invention has been illustrated, the sealing assembly has been shown operatively disposed in a pump installation including a casing 100 having an opening 102 therein through which an impeller shaft 104 extends and in which it is rotatably journalled by means of a ball bearing assembly including inner and outer races 106 and 108 respectively. The inner race 106 may turn with the shaft 104 while the outer race 108 is pressed into the casing 100. The forward face of the casing is provided with a stepped recess 109 having an inner cylindrical wall 110 and an outer cylindrical wall 112 between which there extends a radially disposed wall 114. The recess 109 is adapted to receive therein the package-type sealing assembly of the present invention which has been designated in its entirety at 116.

The seal assembly 116 involves in its general organization a two-part retainer or shell including an outer shell member 118 and an inner nested shell member 120. The inner and outer shell members 120 and 118 together provide a composite container casing including a radially inwardly disposed front wall 122 on the inner shell and a rear wall 124 on the outer shell. The inner edge of the rear wall 124 is provided with an inturned cylindrical flange 126 which surrounds the shaft 104 and which is spaced therefrom a slight distance. The seal assembly 116 includes a sealing washer 130 which is generally of the same configuration as the sealing washer 28 in the form of the invention shown in Fig. 1. The washer 130 is provided with a forwardly extending nose piece 132 and a rearwardly facing circular recess 134 provided with a generally conical bottom face 136. The inner shell 120 is provided with a pair of inwardly offset ribs 138 (Fig. 7) which extend into a pair of diametrically opposed grooves 140 provided in the periphery of the washer 130 for locking the washer to the retainer or shell and preventing rotation of the washer while permitting axial movement thereof relative to the shaft 104.

The washer 130 is adapted to be sealed to the cylindrical portion 126 of the composite retainer casing by means of one or more sealing rings such as the single sealing ring shown at 142. The sealing ring 142 is of frusto-conical design and, like the sealing ring 64 in the other illustrated form of the invention, is formed of a material which is relatively incompressible as for example, Teflon. The inner conical face of the member 142 has a slant angle which is slightly less than the slant angle of the bottom face 136 of the recess 134. A thrust washer 144 has its outer periphery bearing against the rear face of the washer 130 and its inner periphery is formed with a rounded edge 146 which bears against the rear face of the sealing ring 142 at a region adjacent its inner peripheral edge. A circular leaf spring 148 is disposed between the rear wall 124 and washer 144 and normally urges the same forwardly against the sealing ring 142.

The end face 131 of the nose piece 132 is adapted to sealingly bear against a radial face 149 provided on a rotating ring member or seat 150. The seat member 150 is provided with an annular recess 156 providing a conical surface 158. A frusto-conical sealing ring 160, similar to the sealing ring 142, has one end thereof disposed in the recess 136 and the other end thereof bears against the shaft 104 and against the inner race 106 of the ball bearing assembly 106, 108. A spacer ring 162 is disposed within the annular confines of the seat member 150 and may be press fitted therein. One end face 164 of the spacer ring 162 is bevelled and bears against an inclined surface on the sealing member 160.

The seat member 150 is formed with a radial shoulder 166 which extends radially beyond the opening 168 provided in the front wall 122 so as to retain the seat member within the shell-like casing when the sealing assembly 116 is removed from the shaft 104. With the assembly thus isolated, the leaf spring 148 normally urges the washer 130 forwardly in the retainer and the washer in turn urges the seat member 150 forwardly so that the shoulder 166 thereof normally bears against the inner face of the front wall 122 with a portion of said member projecting outwardly through the opening 168 when the seal assembly is not installed. The spacer ring 162 bears firmly against the inner periphery of the cone-shaped member and retains this member in position against dislodgement.

From the above description it will be seen that all of the sealing elements thus far described which are contained within the shell-like container are permanently housed within this container against dislodgement, thus resulting in a package-type seal capable of installation in a recess such as the stepped recess 109 provided in the pump casing 110. In order to secure the assembly within the recess, the radially extending flange 128 may be positioned behind a split snap ring 170 (see also Fig. 7) which is disposed within a groove 172 formed in the outer cylindrical wall 112 of the recess 109. A frusto-conical sealing gasket 174 is disposed within the space existing between the flange 128 and the radial wall 114 and this member has a slant height or radial length slightly greater than the radial distance between the outer surface of the inner shell 120 and the inner surface of the outer cylindrical wall 112 so that when the flange 128 is positioned behind the snap ring 170 a wedging action of the gasket 174 between these two surfaces will result, thus effecting a fluid-tight gasket seal.

In the installation of the package seal 116, the entire unit is telescopically received over the shaft 104 and is inserted in the stepped recess 109 with the parts positioned as shown in Fig. 5. When the radially extending flange 128 clears the annular groove 172 the split snap ring 170 is inserted in position within the groove. The non-compressible frusto-conical gasket 174 will thus be firmly wedged in place between the outer face of the inner shell member 120 and the cylindrical wall of the recess 109. The inner rim of the frusto-conical sealing member 160 will bear against the shaft 104 as well as against the inner race 106 of the ball bearing assembly and thus the rotary seat member 150 will be moved away from the front wall 122 thus shifting the sealing washer 130 to the right as viewed in Fig. 5 against the action of the leaf spring 148. This leaf spring will exert its thrust against the thrust washer 144 which in turn will bear at its inner peripheral rounded edge 146 against the inner circumferential regions of the sealing member 142. The tendency for the sealing member 142 will be to normally urge the washer 130 forwardly against the rotating seat member 150 to form a fluid-tight seal between the opposed sealing surfaces 152 and 154 thereof. A balanced condition will obtain wherein the pressure applied to the sealing ring 142 equals the pressure applied to the sealing ring 160 and these two members will tend to become wedged within the spaces provided for them so that their peripheral edges will effect sealing engagement with the cylindrical surfaces with which they are in contact.

In the form of the invention just described, single frusto-conical sealing members 142, 160 and 174 have been illustrated as effectively performing their sealing function within the spaces provided for them. It will be understood however that if desired plural sealing members such as are employed in connection with the form of the invention shown in Fig. 1 may be utilized in these spaces. Inasmuch as there is less likelihood of a carbonaceous deposit of scale on the shaft 104 in the vicinity of the sealing member 160 one of these members is deemed to be sufficient.

From the above description it will be seen that the present bearing seal will be effective in maintaining a seal against both internal and external pressures relative to a housing through which a shaft may extend. Furthermore the pressure differential is maintained across sealing surfaces which do not rub against one another and the only parts which are subject to wear are the opposed running seal surfaces 131, 152 of the seal assembly.

The invention is not to be limited to the exact arrangement of parts shown in the accompanying drawing and described in this specification as various changes in the details of construction may be resorted to without departing from the spirit of the invention. For example, while the annular recess provided in each of the various sealing washers or seat elements has been shown and described as having a cylindrical wall designed for cooperation with the circular periphery of a frusto-conical sealing member, the recess may, if desired, be other than cylindrical, as for example polyhedral, and designed for cooperation with a commensurately shaped sealing member, such as a frusto-pyramidal member whose polygonal periphery will effect sealing engagement with the walls of the recess when a wedging of the seating member is effected. The term "annular" as employed in the appended claim in relation to the wall of such a recess does not necessarily imply that the wall is truly cylindrical. Only insofar as the invention has particularly been pointed out in the accompanying claim is the same to be limited.

What I claim and desire to secure by Letters Patent is:

In a sealing device for sealing a space between a casing and a shaft, a sealing washer surrounding the shaft and having a radial sealing surface designed for running engagement with a radial surface normal to the shaft and fixed relative to the casing, there being an axial recess in said washer providing an annular wall surrounding the shaft and a bottom wall having an annular groove formed therein in the extreme outer regions thereof and presenting a central frusto-conical portion, the outer wall of said groove constituting a continuation of the cylindrical wall of said recess, said groove and frusto-conical bottom wall providing in combination an annular shoulder, a continuous frusto-conical sealing ring of resilient deformable material having a substantial degree of resistance to compressional forces encircling the shaft within the recess and bearing inwardly against the shaft and outwardly against the wall of the recess, said ring being free of radial slits and having a slant height greater than the radial distance between the shaft and wall, the large base of said frusto-conical sealing ring extending into said groove, said annular shoulder opposing the inside face of the sealing ring along a circular region slightly removed from said large base of the ring frustum, and thrust means normally applying axial pressure to said sealing ring at a region adjacent the small base thereof in an axial direction to wedge the material of the ring into engagement with said shaft, annular wall and recess bottom.

References Cited in the file of this patent

UNITED STATES PATENTS

| | | |
|---|---|---|
| 772,640 | Benson | Oct. 18, 1904 |
| 844,525 | Lee | Feb. 19, 1907 |
| 1,995,109 | Smittle | Mar. 19, 1935 |
| 2,148,093 | Wheeler | Feb. 21, 1939 |
| 2,236,370 | Jackman | Mar. 25, 1941 |
| 2,352,636 | Jackman | July 4, 1944 |
| 2,429,953 | Bottomley | Oct. 28, 1947 |
| 2,467,312 | Jack | Apr. 12, 1949 |
| 2,567,527 | Parks | Sept. 11, 1951 |

FOREIGN PATENTS

| | | |
|---|---|---|
| 25,138 | Great Britain | Nov. 29, 1898 |